United States Patent [19]

Westfield et al.

[11] Patent Number: 5,002,326

[45] Date of Patent: Mar. 26, 1991

[54] AUTOMOTIVE WINDSHIELD LAMINATED PROTECTOR

[76] Inventors: William R. Westfield, 32 Dressel Dr., Mastic, N.Y. 11950; Catherine M. Spicer, 1222 Puritan Ave., Bronx, N.Y. 10461

[21] Appl. No.: 468,195

[22] Filed: Jan. 22, 1990

[51] Int. Cl.$^5$ .............................................. B60J 1/20
[52] U.S. Cl. ................................. 296/95.1; 160/370.2
[58] Field of Search ..................... 296/95.1; 160/370.2; 150/168

[56] References Cited

U.S. PATENT DOCUMENTS

| | | | |
|---|---|---|---|
| 3,140,115 | 7/1964 | Bliss | 160/370.2 X |
| 4,768,823 | 9/1988 | Martinez | 160/370.2 X |
| 4,889,754 | 12/1989 | Vargas | 296/95.1 X |

FOREIGN PATENT DOCUMENTS

| | | | |
|---|---|---|---|
| 741933 | 1/1970 | Belgium | 296/95.1 |
| 3221766 | 12/1983 | Fed. Rep. of Germany | 296/95.1 |
| 26622 | 2/1983 | Japan | 296/97.2 |
| 671373 | 8/1989 | Switzerland | 296/95.1 |

*Primary Examiner*—Margaret A. Focarino
*Assistant Examiner*—Gary C. Hoge
*Attorney, Agent, or Firm*—Michael I. Kroll

[57] ABSTRACT

A laminated, adhesive-backed polycarbonate resin system, to protect the windshield glass of a passenger car, truck, bus, etc., which includes a multi-layering of thin polycarbonate film that is non-permanently bonded to, preferably, the entire outer surface area of a motor vehicle's windshield glass, is disclosed. The non-permanent bonding is preferably accomplished by use of a pressure-sensitive adhesive on one side of the polycarbonate film. For use upon an automobile, an owner or driver of an automobile would remove a wax film, or other adhesive-protector, from a first layer of polycarbonate, thereby exposing the adhesive for the first layer. The individual would then, preferably by pressure-sensitive means, apply the adhesive surface of the first layer of the polycarbonate to the outer surface of a motor vehicle windshield. As the top layer of the polycarbonate layer system, which is exposed directly to the elements, becomes worn due to the use of the automobile on a day-in-day-out basis, after a reasonable time, the owner of the automobile would simply peel back the top (last) layer of polycarbonate film in order to expose a new layer of polycarbonate film.

8 Claims, 1 Drawing Sheet

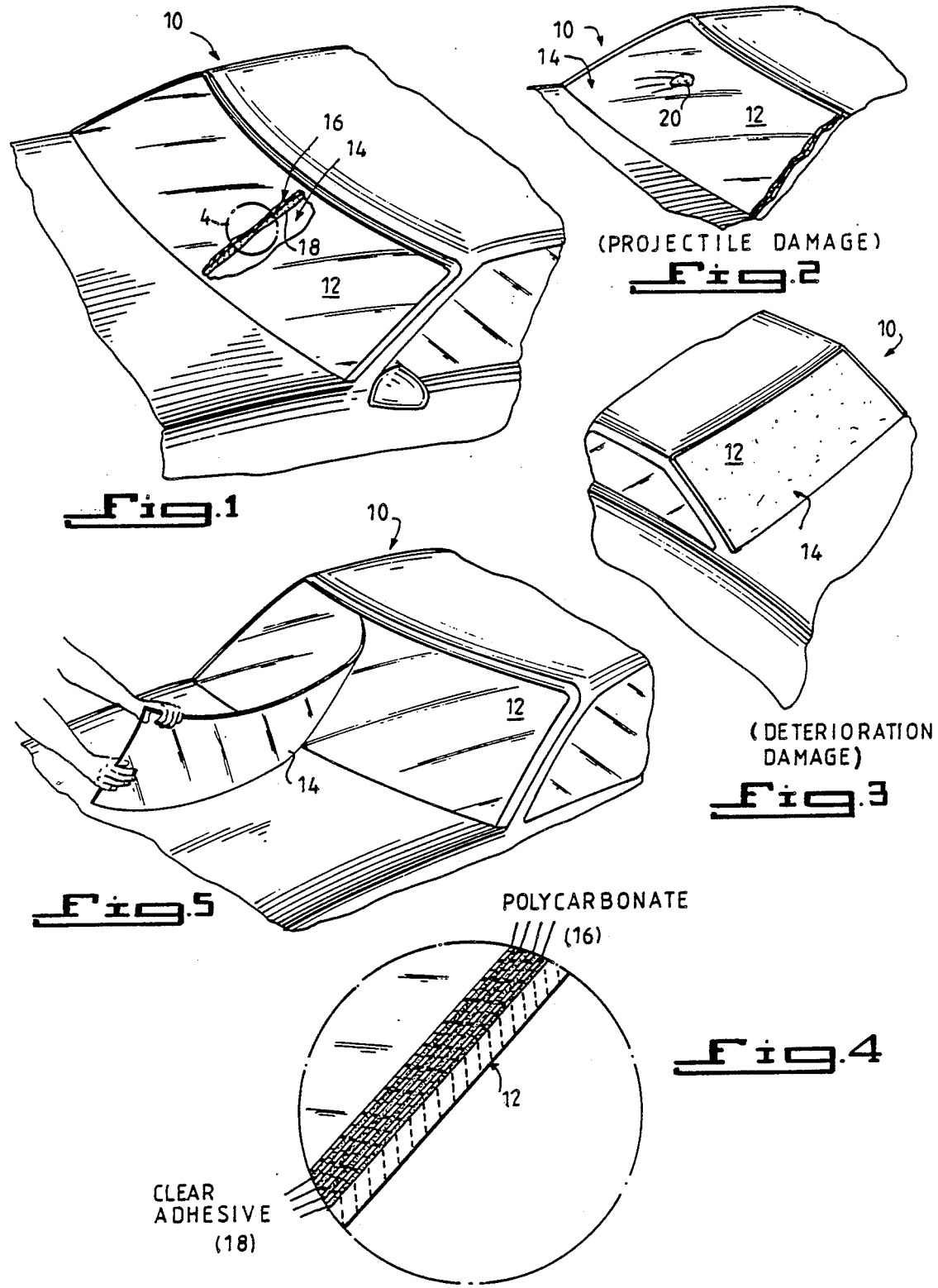

AUTOMOTIVE WINDSHIELD LAMINATED PROTECTOR

BACKGROUND OF THE INVENTION

1. Field of the Invention

The present invention relates generally to an automotive windshield protector. More particularly, the present invention relates to disposable laminated, adhesive-backed polycarbonate proctector for application to the windshields of motor vehicle, e.g., passenger cars.

2. Description of the Prior Art

Prior to the present invention, owners or drivers of automobiles who experienced damage from a projectile (e.g., a stone kicked up on a road by a preceding automobile, objects which had fallen from passing trucks, etc.) to their automotive windshields had to either replace the entire windshield or accept the permanent damage done to their automobiles. Of course, in addition to the physical damage which may be done to the windshield of an automobile by a projectile, such projectiles and/or the damage done to the driver's automobile, represent a safety hazard.

Heretofore, no means existed for the safe and inexpensive protection of the windshield of one's automobile.

In addition, no means, other than the automobile's windshield wipers or the manual labor of an individual, existed for a quick and convenient cleaning of the windshield of an automobile.

SUMMARY OF THE INVENTION

It is, therefore, an object of the present invention to provide a windshield protector device which will fulfill the need lacking in the prior art.

It is a further object of the present invention to provide a windshield protector device which may be quickly and conveniently applied to the outer surface of an automobile windshield.

It is an additional object of the present invention to provide a windshield protector device which may be manufactured and sold at an inexpensive cost.

It is, yet, a further object of the present invention to provide a windshield protector device which increases safety for passengers riding in the automobile.

It is still a further object of the present invention to provide a windshield protector device which may be readily removed from an automobile windshield following a period of time of use.

The foregoing and related objects are accomplished by a laminated, adhesive-backed polycarbonate resin system to protect the windshield glass of a passenger car, truck, bus, etc., which comprises a multi-layering of thin polycarbonate film that is non-permanently bonded to, preferably, the entire outer surface area of a motor vehicle's windshield glass. The non-permanent bonding is preferably accomplished by used of a pressure-sensitive adhesive on one side of the polycarbonate film.

The polycarbonate resin, or film, or as referred to hereinafter as simply "polycarbonate," is preferably Lexan (a registered trademark of the General Electric Company for transparent polycarbonate resin.) It will be appreciated, however, that various other flexible, durable and transparent materials may also be used in the claimed combination of the present invention. Thus use of Lexan, however, is the preferred material.

The combined thickness of the plurality of layers of polycarbonate with adhesive should preferably be no more than about 3/16-inch. The total number of layers of polycarbonate should preferably be between 12 and 16, though it will be appreciated by those of ordinary skill in the relevant art that a fewer number or greater number of layers may be used for the present invention and is encompassed within the scope thereof.

For use upon an automobile, an owner or driver of an automobile would remove a wax film, or other adhesive-protector, from a first layer of polycarbonate, thereby exposing the adhesive for the first layer. The individual would then, preferably by pressure-sensitive means, apply the adhesive surface of the first layer of the polycarbonate to the other surface of a motor vechicle windshield.

As the top layer of the polycarbonate layer system (which may be thought of as the layer of polycarbonate furthest from the first layer of polycarbonate, which is directly removably affixed to the windshield, i.e., the last layer of polycarbonate), which is exposed directly to the elements, becomes worn due to the use of the automobile on a day-in-day-out basis, after a reasonable time, the owner of the automobile would simply peel back to top (last) layer of polycarbonate film in order to expose a new layer of polycarbonate film.

Successive layers of polycarbonate film are removed, one-by-one, in a like manner until the layer (i.e., first layer) which is directly applied to the windshield is worn and eventually removed. Thereafter, an entriely new polycarbonate resin/film system, as per the present invention, may be applied.

Among the advantages provided by the present invention is that the polycarbonate system herein disclosed incorporates the high-impact resistance properties of polycarbonate in order to deflect airborne projectiles, such as rocks, road debris, etc., thereby preserving the windshield glass intact and protecting the automobile's occupants from serious injury.

The present invention further has the advantage of providing an additional measure of theft resistance to the automobile.

It should, of course, be recognized that, as appropriate and as desired by the owner of an automobile, the inventive polycarbonate system of the present invention may be employed on any other window of an automobile, such as side and rear windows, in order to protect the same from damage. Likewise, the polycarbonate protective system of the present invention may also be used to protect other portions of an automobile, such as, for example, a particularly distinctive ornamental grill design, etc.

To the accomplishment of the above and related objects, the present invention may be embodied in the form illustrated in the accompanying drawing figures, attention being called to the fact, however, that the drawing figures are intended to be illustrative only, and that changes may be made in the specific construction illustrated and described within the scope of the appended claims.

BRIEF DESCRIPTION OF THE DRAWING FIGURES

In the drawing, wherein similar reference numerals denote similar features throughout the several views:

FIG. 1 is a perspective view of an automobile windshield with the automotive windshield protector to the present invention affixed thereto and further including a cross-sectional view of the inventive automotive windshield protector;

FIG. 2 is a perspective view of an automobile windshield with the automotive windshield protector of the invention affixed thereon as the windshield protector is struck by a projectile;

FIG. 3 is a further perspective view of an automobile windshield with the automotive windshield protector of the invention affixed thereon showing deterioration damage;

FIG. 4 is an enlarged, cross-sectional prospective view of the automotive windshield protector of the present invention shown within the circular area, designated by the numeral "4," of FIG. 4; and, FIG. 5 is a perspective view of an automobile windshield, with the automotive windshield protector of the present invention affixed thereto, showing an individual removing a top layer of polycarbonate film therefrom.

DETAILED DESCRIPTION OF THE PREFERRED EMBODIMENTS

Turning, now, in detail, to an analysis of the accompanying drawing figures, FIGS. 1, 2, 3 and 5 show an automobile 10 having a front windshield 12. Removably affixed upon windshield 12 is the polycarbonate automobile windshield protector device 14 of the present invention. Windshield protector device 14 is preferably removably affixed to windshield 12 via a pressure-sensitive adhesive and, preferably, affixed to the entire area of the outer surface of windshield 12.

As best shown in FIG. 1, 2 and 4, windshield protector device 14 is a multi-layered protector system comprising a plurality of polycarbonate layers 16, each of which includes a clear adhesive 18 on one side which allows one layer 16 of polycarbonate to removably adhere to an adjacent layer of polycarbonate. Layers 16 are, preferably, laminated.

More particularly, the automotive windshield protector device 14 is initially adhered to windshield 12, with all layers 16 of polycarbonate being retained. For purposes of discussion and convenience, the layer of polycarbonate which is directly adhered to windshield 12 shall be designated as the "first" layer, or "bottom" layer while the layer of polycarbonate which is, initially, outwardly exposed to the elements shall be designated as either the "last" layer, or "top layer". It should be recongnized that such designations are wholly arbitrary.

When initially applied to the automobile windshield 12, the first layer of polycarbonate 16 is adhered by clear adhesive 18 to said windshield. Successive layers of polycarbonate are adhered to the adjacent layer immediately below. Between each layer 16 is a clear adhesive layer 18. It is preferred, however, that adhesive layer 18 be so applied that when the top layer 16 is removed, as will be explained in greater detail hereinafter, that the adhesive of such top layer primarily be retained by the top layer, rather than primarily being retained by the outwardly directed surface of such layer immediately below.

FIG. 2 shows a projectile 20 striking the windshield protector device 14 applied to windshield 12. When struck, protector device 14 absorbs the shock and prevents the damage which would otherwise occur to windshield 12.

Over time, numerous projectiles, similar to the projectile shown in FIG. 2, might be expected to strike protective device 14, thereby causing a degree of deterioration damage, as illustrated in FIG. 3.

After a sufficient length of time, the owner of the automobile will peel off the top, or last layer 16 of polycarbonate, which has experienced the deterioration damage shown in FIG. 3, and expose a new, clear layer 16 of polycarbonate, i.e., the layer next to the top layer. The clear adhesive layer 18 of the top layer, once removed, would preferably be retained by the top layer, rather than the layer immediately adjacent, and beneath, the top layer.

Successive layers 16 of polycarbonate would be removed, over time, in a similar manner by the owner of the automobile.

The preferred number of polycarbonate layers 16 which would initially comprise the protector device 14 would be between 12 to 16, though, clearly a number of layers outside of this preferred range is possible.

When first applied to the windshield of an automobile, the preferred thickness of the windshield protector device would be 3/16-inch.

It will be apparent to those of ordinary skill in the art that numerous modification may be made to the present invention, for example, a clear, flexible suface, other than polycarbonate resin may be employed.

Further, the invention can, of course, be employed on other windows of the automobile, or even on the body of the automobile itself.

LIST OF REFERENCE NUMERALS 10 automobile
12 automobile windshild
14 automotive windshield protector device
16 layers of polycarbonate of protector device
18 layers of clear adhesive of protector device
20 projectile It will be understood that each of the elements described above, or two or more together, may also find a useful application in other types of methods differing from the type described above.

While certain novel features of the present invention have been shown and described and are pointed out in the annexed claims, the present invention is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will fully reveal the gist of the presnet invention so that others can, by applying current knowledge, readily adapt it for various applications without omitting features that, from the standpoint of prior art, fairly constitute essential characteristics of the generic or specific aspects of this invention.

What is claimed is:

1. An automotive windshield protector, comprising:
    at least two layers of a polycarbonate resin and having a clear adhesive applied to one side of each of at least two layers of polycarbonate resin so as to form a laminate and for the removable adhearing of said at least two layers of polycarbonate resin wherein said laminate formed by the at least two layers is applied to an outer surface of a windshield of a motor vehicle, when initially applied to the automobile windshield said first layer of polycarbonate is adhered by a clear adhesive to the windshield, successive layers of polycarbonate are adhered to the adjacent layer immediately below, between each of said layers is said clear adhesive layer, said adhesive layer being so applied that when the top layer is removed said adhesive layer of said top layer will primarily be retained by said top layer rather than primarily being retained by the outwardly directed surface of such a layer immediately below.

2. The automotive windshield protector according to claim 1, having a plurality of said polycarbonate resin layers wherein each layer of said plurality of polycarbonate layers is removably adhered to an adjacent lower layer with successive top layers being individually removable following deterioration damage.

3. The automotive windshield protector according to claim 2, wherein said plurality of said polycarbonate resin layers is 12 to 16 of said layers.

4. The automotive windshield protector according to claim 2, wherein said plurality of said polycarbonate resin layers has a total thickness of 3/16" or less, the total thickness being necessary so as to assure that the driver can see clearly through the windshield.

5. The automotive windshield protector according to claim 2, wherein said plurality of said polycarbonate resin layers have an area which covers the entire windshiled of the motor vehicle.

6. The automotive windshield protector according to claim 1, wherein said at least two polycarbonate resin layers have an area which covers the entire windshield of the motor vehicle.

7. The automotive windshield protector according to claim 2, wherein each of said polycarbonate resin layers is laminated to each other by said clear adhesive.

8. The automotive windshiled protector according to claim 1, wherein said at least two polycarbonate resin layers are laminated to each other by said clear adhesive.

* * * * *